US008515851B2

(12) United States Patent     (10) Patent No.:    US 8,515,851 B2
Cardoza et al.                   (45) Date of Patent:     Aug. 20, 2013

(54) METHOD AND SYSTEM FOR GENERATING AN INDEX OF SECURITIES

(75) Inventors: Keith M Cardoza, Chicago, IL (US); James E. Malackowski, Chicago, IL (US); Cameron Gray, Chicago, IL (US); Eric Fried, Chicago, IL (US)

(73) Assignee: Ocean Tomo LLC, Chicago, IL (US)

( * ) Notice: Subject to any disclaimer, the term of this patent is extended or adjusted under 35 U.S.C. 154(b) by 0 days.

(21) Appl. No.: 13/273,673

(22) Filed: Oct. 14, 2011

(65) Prior Publication Data

US 2012/0084295 A1    Apr. 5, 2012

Related U.S. Application Data

(62) Division of application No. 12/225,052, filed as application No. PCT/US2007/006290 on Mar. 13, 2007.

(60) Provisional application No. 60/781,324, filed on Mar. 13, 2006, provisional application No. 60/799,655, filed on May 12, 2006.

(51) Int. Cl.
     *G06Q 40/00*         (2012.01)

(52) U.S. Cl.
     USPC ......................................................... 705/36 R

(58) Field of Classification Search
     CPC ........................................................ G06Q 40/06
     USPC ................................................. 705/36 R, 37
     See application file for complete search history.

(56) References Cited

U.S. PATENT DOCUMENTS

| | | | |
|---|---|---|---|
| 6,175,824 B1 * | 1/2001 | Breitzman et al. .......... | 705/36 R |
| 6,832,211 B1 | 12/2004 | Thomas et al. | |
| 7,177,831 B1 * | 2/2007 | O'Shaughnessy et al. . | 705/36 R |
| 7,657,476 B2 * | 2/2010 | Barney ............................ | 705/35 |
| 7,716,103 B1 * | 5/2010 | Donner ....................... | 705/36 R |
| 8,131,620 B1 * | 3/2012 | Steinberg et al. .......... | 705/36 R |
| 2001/0034695 A1 | 10/2001 | Wilkinson | |
| 2002/0004775 A1 | 1/2002 | Kossovsky et al. | |
| 2004/0049448 A1 * | 3/2004 | Glickman ....................... | 705/37 |
| 2004/0117284 A1 | 6/2004 | Speth | |
| 2005/0010481 A1 * | 1/2005 | Lutnick et al. .................. | 705/26 |
| 2005/0171884 A1 | 8/2005 | Arnott | |
| 2006/0015433 A1 * | 1/2006 | Arnott et al. .................... | 705/35 |
| 2007/0106587 A1 * | 5/2007 | Orloske et al. .............. | 705/36 R |

OTHER PUBLICATIONS

Cornelli et al., "Patent renewals and R&D incentives", Rand Journal of Economics, vol. 30, No. 2, Summer 1999, pp. 197-213.*

Narin, Francis et al., *Handbook of Quantitative Science and Technology Research*, Chapter 25, pp. 553-568; 2004 Kluwer Academic Publishers; Printed in the Netherlands.

Lipfert, Stephan, and Guido von Scheffer, Europe's first patent value fund, *Intellectual Asset Management*, Dec./Jan. 2006, pp. 15-18, issue 15.

* cited by examiner

*Primary Examiner* — Eric T Wong

(74) *Attorney, Agent, or Firm* — Valauskas Corder LLC

(57) ABSTRACT

A method for generating an index of securities includes selecting index constituents and weighing the selected index constituents by a measure ("an intangible asset measure") of quality and/or value of the intangible assets of constituent entities. The index constituents can be selected from a set of potential constituents based on an intangible asset measure of each constituent in the set, and the selected index constituents may then be weighted by a desired measure or methodology or weighted equally, or by an intangible asset measure. Another method for generating an index of securities includes combining groups of constituents, which are selected based on an intangible asset measure, to be index constituents and weighing the index constituents by a desired measure or methodology.

13 Claims, 8 Drawing Sheets

METHOD AND SYSTEM FOR GENERATING AN INDEX OF SECURITIES

RELATED U.S. APPLICATION DATA

This application is a divisional of U.S. Ser. No. 12/225,052 filed Sep. 12, 2008, which is a U.S. national application of PCT/US07/006290 filed on Mar. 13, 2007 that claims priority to provisional application No. 60/781,324 filed on Mar. 13, 2006, and provisional application No. 60/799,655, filed on May 12, 2006.

FIELD OF THE INVENTION

The present invention relates generally to methods and systems for generating an index of securities, and more particularly, to a method and system for generating an index of securities whose index constituents are selected and/or weighted by measures of quality or value of the intangible assets of the constituent entities. The present invention also relates to asset management and the application of the methods and systems for generating an index of securities as described herein.

BACKGROUND ART

Indices have been used by investors as market indicators and for constructing investment portfolios, funds, or other products and services linked to one or more indices. Conventional security indices do not evaluate a company's intangible assets and may overemphasize the importance of tangible assets. As the economy has transformed from a manufacturing base manned by laborers to a service base driven by knowledge workers, intellectual capital has emerged as a leading asset class among industrialized countries worldwide.

The term intellectual capital refers generally to the value of a company's intangible assets including such assets as intellectual property, sales & marketing information, assembled work force/management, leasehold rights, and other assets without tangible, physical substance. "Intellectual property assets," as used herein includes patents, trademarks, copyrights and trade secrets, as well as research and development, inventions, discoveries, improvements, modifications, enhancements, technologies, methods and production/process information know-how, expertise, algorithms, compositions, data, works, concepts, designs, ideas, prototypes, writings, notes, licenses and patent applications.

Calculating the value of all intangibles, both internally developed and acquired, by subtracting tangible book value from the market value of the companies within the S&P 500.RTM. index, intangible value as a percentage of market value has grown from 16.8% in 1975, to 79.7% in 2005. In 1975, intangible value made up 73% of the value of the health care sector and 63% of the value of the information technology sector, but less than 15% of the value in almost all other sectors. By 2005, most sectors attribute more than three-quarters of their market value to intangibles.

Traditional measurements used by investors fail to fully capture the extent of the transformation to the predominance of intangible assets over tangible assets. A more purposeful focus on intangibles may benefit investors much more than an analysis of tangible assets, especially since the growth in the value of a stock is more dependent upon the growth of its intangible value rather than its tangible value.

What is needed, therefore, is a method and system for generating intangible asset indices that focus on the value and/or quality of intangible assets, and likewise, investment products based on such intangible asset indices and services relating to their construction.

BRIEF SUMMARY OF THE INVENTION

The present invention provides a method and system for investors to capitalize on the rewards of innovation and technology by investing in intellectual capital equity. As investors make well-grounded assessments about the value of a company's innovation and technology—the intangible value of a company—it may give them the competitive advantage in the marketplace to produce a higher returning and/or reduced risk portfolio. For example, investors may produce a portfolio which consists of the stocks (or other securities) of companies that own valuable patents, which can serve as a proxy for intellectual capital value. A portfolio based on intellectual capital value would allow investors to commit a sustainable and meaningful portion of their assets to a leading asset class of the knowledge economy.

An embodiment of a method for generating an index of securities presented herein includes selecting index constituents and weighing the index constituents in the index by an intangible asset measure of each index constituent. Measures of quality and/or value of the intangible assets of companies or other entities are referred to herein as "intangible asset measures."

In another embodiment, the method includes selecting index constituents from a set of potential constituents based on an intangible asset measure of each constituent in the set and weighing the index constituents in the index. Any desired measure or methodology may be used to assign a weight to each index constituent. In one embodiment, the index constituents are weighted equally.

Another method for generating an index of securities includes selecting two or more groups of constituents from two or more sets of potential constituents based on an intangible asset measure of each potential constituent in the two or more sets, combining the two or more groups of constituents to be index constituents, and weighing the index constituents. Any desired measure or methodology may be used to assign a weight to each index constituent.

The groups of constituents may be stocks of existing indices having assigned weights in the existing indices based on intangible asset measures of the stocks. In one embodiment, stocks of two or more existing indices are united together to generate a combined index, where each index constituent corresponds to a stock in the two or more existing indices. In another embodiment, the stocks have been assigned weights in the existing indices based on intangible asset measures of the stocks, and these assigned weights of the stocks are used in a calculation of the weights of the index constituents which correspond to these stocks.

A system for generating an index of securities is also presented and includes a computer useable medium having a computer program logic recorded thereon for controlling at least one processor. The computer program logic includes computer program code means for implementing the method presented herein.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE INVENTION

Figure 1:
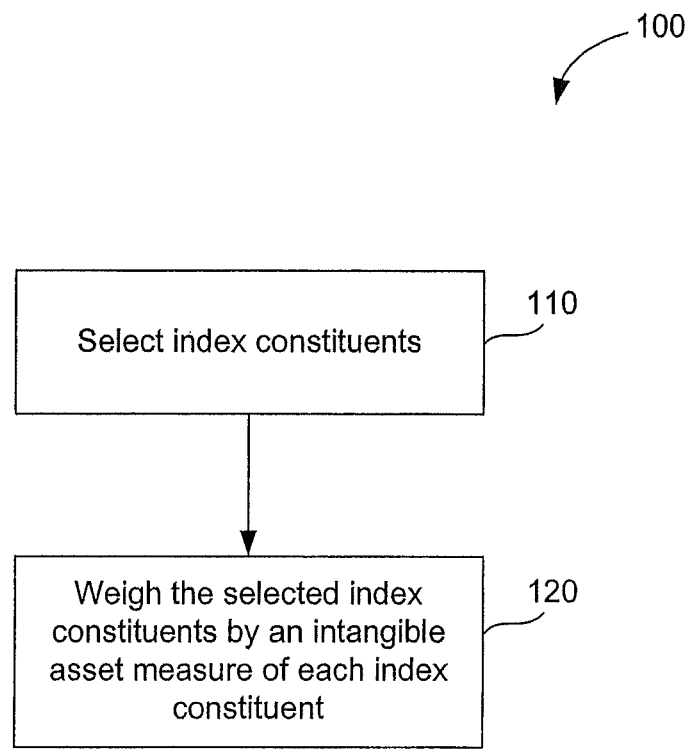
FIG. 1 is a flowchart illustrating steps performed in one embodiment of a method according to the present invention.
Figure 2:
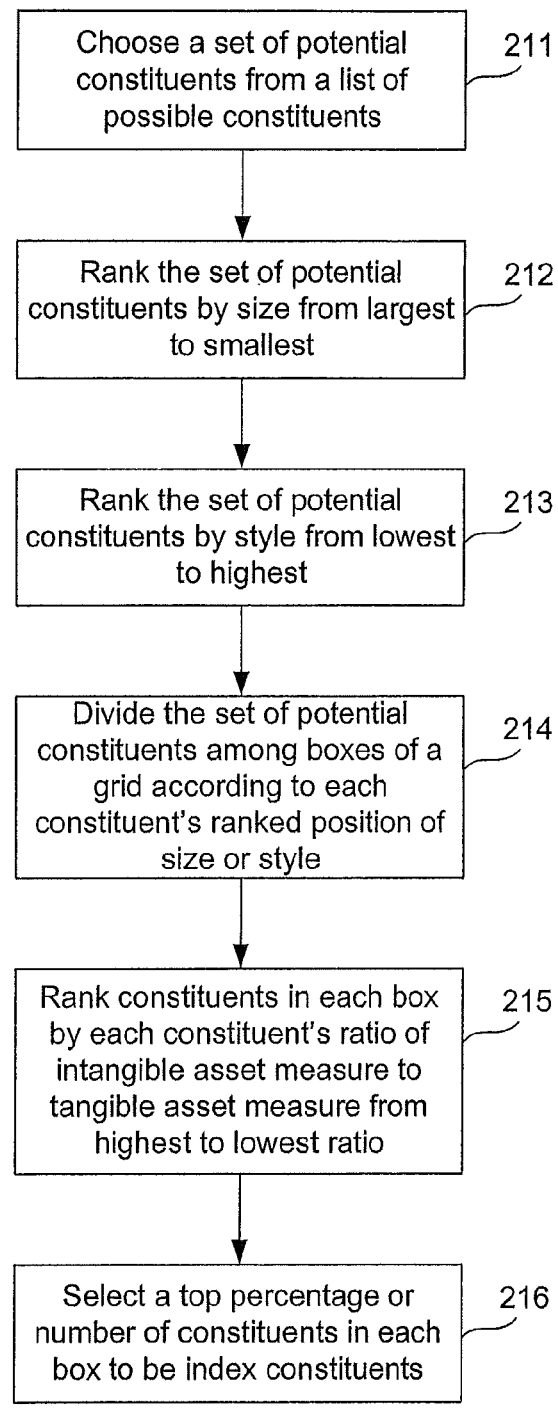
FIG. 2 is a flowchart illustrating steps performed for selecting index constituents in another embodiment of the method according to the present invention.
Figure 3:
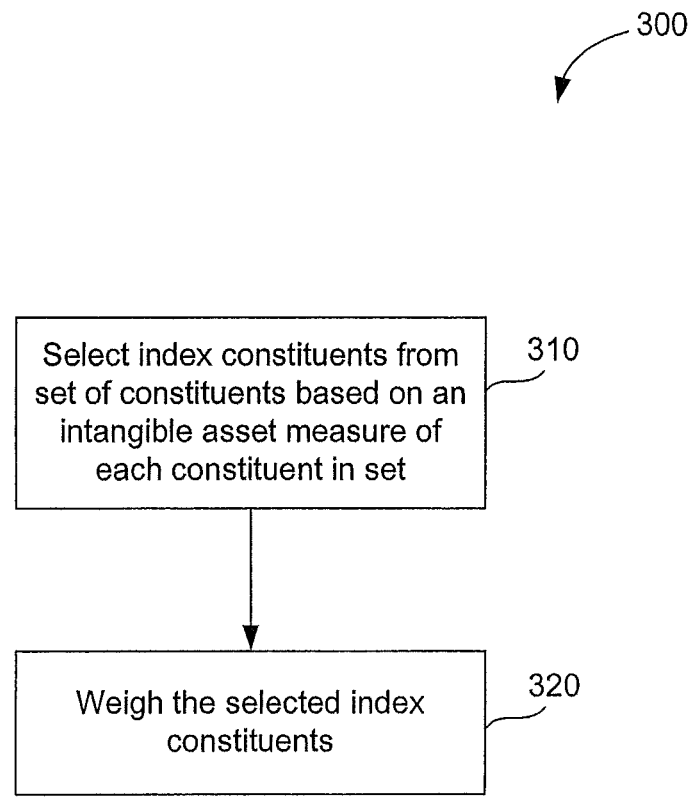
FIG. 3 is a flowchart illustrating steps performed in another embodiment of the method according to the present invention.

FIGS. 1-3 illustrate steps performed in various embodiments of a method disclosed herein for generating an index of securities whose constituents ("index constituents") are selected and/or weighted by measures of quality and/or value of the intangible assets of the constituent entities. A method 100 is shown in FIG. 1 and includes step 110 and step 120. In step 110, constituents of an index are selected, and in step 120, the index constituents are assigned a weight based on an intangible asset measure of each index constituent. Generally, each index constituent's weight is calculated by calculating the ratio of the intangible asset measure of the index constituent to the sum of the values of the intangible asset measures of all index constituents, As indicated above, "intangible asset measures" are measures of quality and/or value of the intangible assets of companies or other entities. The index being generated according to a method disclosed herein may incorporate a measure of quality or value of any intangible asset, including but not limited to intellectual property assets. Where a patent-based index (one such example of an intellectual property index) is desired, the intangible asset measure for each index constituent may be a patent rating measure, which can serve as a proxy for intellectual capital value. Patent rating measures may include, for example:

Patent Count: The number of in-force U.S. utility patents a company owns.

Patent Age: The average age of in-force patents within a company's portfolio.

Patent Decay Rate: An estimated obsolescence rate approximating a rate at which the identified patents will lose value over time.

Patent Velocity: The quarterly increase or decrease in the number of in-force patents owned by a company.

Patent Flow: The patent velocity expressed as a percentage of the total number of new patents required to replace the older patents, assuming the estimated decay rate. In other words, patent flow may be the patent velocity divided by an estimate of the number of patents becoming obsolete in a quarter, assuming a given decay rate.

Patent Abandonment Count: The number of patents for which a company fails to a pay a maintenance fee.

Patent Diversification: The diversity of patents within a company's portfolio.

Total Patent Forward Cites: The cumulative total of forward citations to patents within a company's portfolio.

New Patent Forward Cites: The cumulative total of new forward citations to patents within a company's portfolio in a particular quarter.

Average Intellectual Property Quotient (IPQ.TM.) score: A score which provides a gauge for measuring and comparing patent quality/value based on the cumulative characteristics of patents that make them statistically either more or less likely to produce economic returns, similar to IQ scores used for rating human intelligence (median=100). IPQ.TM. scores are generated by, and publicly available from, Ocean Tomo Patent Ratings, LLC of Newport Beach, Calif.

Patent Maintenance Value (PMV): A particular relative patent value based on statistical probability that a patent or group of patents will be maintained. Ocean Tomo Patent Ratings, LLC generates a PMV called Ocean Tomo Maintenance Value (OTMV). The PMV may incorporate such factors as United States Patent & Trademark Office maintenance data on the patent or group of patents, relative strength/quality scores of the particular patent or group of patents, such as that provided by the IPQ.TM. score, and data on abandonment of similar and related patents.

Patent Exchange Value (PEV): A relational value of patents in comparison to all patents, as well as patents within the same classification, which is generated by objectively analyzing the same characteristics/metrics and criteria for all patents. Ocean Tomo Patent Ratings, LLC generates a PEV called Ocean Tomo Patent Exchange Value (OTEV).

Moreover, these or other patent rating measures may be selectively combined, placed in relation to each other, or placed relative to other intangible and/or tangible asset information or metrics, to produce additional metrics. For example, change in patent abandonment count, ratio of PMV to market capitalization, or ratio of PMV to research and development expenditures may also serve as patents rating measures.

For the purposes of illustration, a variety of metrics available from Ocean Tomo Patent Ratings have been given herein as example of metrics which may be useful for determining the strength of the intellectual property of a corporation. It will be appreciated that a variety of other metrics (produced by any number of firms) may be used without departing from the scope of the present invention.

As should be apparent, similar rating measures can be constructed for other intangible intellectual property assets for generating an intellectual property index. Likewise, other metrics applicable to other intangible assets involved may be constructed so as to provide a measure of quality and/or value of the particular asset. As should also be apparent, a rating measure may be constructed which combines individual rating measures of several types of intangible assets. For example, a combined copyright and trademark rating measure of a particular company may be its market capitalization less the following: tangible and booked intangible assets, estimated value of other intangible assets other than patents, trademarks and copyrights (including subtraction of non-patented technology value, such as patent applications and in-process research and development), and patented technology value (e.g., the patent maintenance value, described above). Moreover, trademark rating measures, copyright rating measures, and patent rating measures may be combined to provide a composite measure of the quality and/or value of a company's intangible intellectual property assets.

Trademark rating measures may be developed from statistics relating to: number and extent of U.S. and international trademark filings (which may be further categorized based on trademark class and number of marks owned by the company per class, for example); details in the file history of registered trademarks (such as 'similar' brands applied in refusals during the trademark's prosecution, a declaration of incontestability ("Section 15" filings), and trademark renewals, for example); periodic information on sales related to a trademarked brand; trademarked brand reputation as reflected in consumer polls; frequency that a trademark is searched on the Internet; number of website domain registrations incorporating a trademark and reported traffic to each website; number and extent of similar trademarks owned by others; and/or actual or estimated corporate revenues and profits by brand. Selection of the most relevant statistics as they bear on stock price may be considered by conducting a regression analysis of historical stock price of a brand. Trademark rating measures may also include, for example: dollar Values of brands of companies, such as the brand values published and ranked annually by Interbrand/Omnicom Group of New York, measures of brand loyalty, the amount of time a brand has been in use, secondary trademark market data, vulnerability of a brand to counterfeiting and/or dilution, and metrics based on the change in recognition of brands of companies between specific time periods. An index incorporating a metric based on change in brand recognition may be constructed to include constituent companies whose brands have increased in recognition, even if these companies do not necessarily have a strong or highly recognized brand as exhibited by dollar value or other measure. Further, a trademark rating measure may reflect relative brand power between multiple brands in a known market space. Still another trademark rating measure may reflect a brand's sensitivity to overall performance of a market segment or performance of other brands in that segment (such as by measuring covariance between brands or between brands and market segment).

Brand-owning companies may be identified by reviewing the registered trademarks and trademark applications using the United States Patent & Trademark Office database (www.uspto.gov) and other worldwide data sources. It may then be determined whether these brand owners are publicly traded companies, such as by comparing the name of the trademark owner to a list of publicly traded companies. Once publicly traded, brand-owning companies and their corresponding brands have been identified, the quality and/or value of these brands (i.e., trademark rating measures) may be measured. The relevancy of a trademark rating measure to a brand-owning company's stock price may be gauged by determining what correlations exist, if any, between the company's stock price and the value of the particular trademark rating measure based on historical data. In this manner, it may be determined which trademark rating measure(s) provide useful yardsticks of the quality and/or value of the brands of publicly traded companies.

A similar methodology may be employed to determine publicly traded companies' ownership of copyrights. Copyright rating measures may be based on, for example, revenues attributable to the sale or licensing of copyrighted material, such as software, videos, films, albums, recordings, newspapers, online resources, or other media. The particular ratings associated with a copyright portfolio may depend on, for example, the distribution medium of the sales of the copyrighted work, objective or objective reviews of the copyrighted work, awards received for the copyrighted work, consumer survey information reflecting the perceived value of the copyrighted work, secondary market data, and/or the vulnerability of the copyrighted work to piracy.

Trade secret ratings may be developed from statistics relating to: research and Development (R&D) spending, size and strength of a patent portfolio, relationship, between past R&D spending and issued patents (for a particular firm or for an industry) relationship between past R&D spending and successful development of commercially viable technology (for a particular firm or for an industry), an independent (objective or subjective) assessment of trade secret value (for example, conducted under a non-disclosure agreement), and/or the vulnerability of a trade secret to theft or inadvertent disclosure.

Composite intellectual capital ratings may be developed from statistics relating to: measures of the intellectual value of a company's employees (for example, number of invited presentations per employee, published journal articles, number of advanced degrees, and so on); quality of a company's training programs; history of successful recruitment and retention of employees; demonstrated regulatory expertise and/or trackrecord of successful contractual relationships.

Methods and systems for rating/valuing intangible intellectual property assets are described in U.S. Pat. No. 6,556,992 to Barney et al., U.S. Patent Appl. Pub. No. 2004/0010393 to Barney, and U.S. Patent Appl. Pub. No. 2004/0220842 to Barney, the entire disclosures of which are hereby incorporated by reference in their entirety.

FIG. 2 illustrates one method which may be performed for selecting index constituents in step 110. While particular methods are provided herein for selecting the index constituents, it should be understood that other methods may be used without departing from the spirit and scope of the invention. In step 211, a set of potential constituents is chosen from a list of possible constituents. This list of possible constituents may represent any collection of companies or other entities. In one embodiment, the list of possible constituents is a set of constituents of an existing index, such as S&P 1500® index, Russell 3000® index, Wilshire 5000® index, or Morgan Stanley EAFE.RTM. index. The set of potential constituents may include all or part of the set of constituents of the existing index. Where the index being generated is based on a patent rating measure, the constituents of the existing index that are securities of companies that do not own patent portfolios may be initially eliminated so as to not be chosen for the set of potential constituents. In one embodiment, the set of potential constituents are chosen by ranking the constituents of the existing index based on a measure of each constituent's liquidity, from highest to lowest liquidity, and selecting only a top percentage of the ranked constituents to be the set of potential constituents, thereby keeping the stocks with the most liquidity and excluding the stocks with the least liquidity. Liquidity may be measured by average daily dollar volume traded on a particular date, but other criteria of what constitutes liquidity may be used.

In step 212, the chosen set of potential constituents are ranked by their size from largest to smallest size. Market capitalization, sales, net income, or other criteria for what constitutes size, and any combination thereof, may be used to define the size of each constituent.

In step 213, the set of potential constituents are ranked by their style, along the spectrum between being value stocks and growth stocks. For example, stocks with high dividends and low price-to-earnings ratios are value stocks and stocks with low dividends and high price-to-earnings ratios are growth stocks. Price-to-book, price-to-earnings, dividend yield, or other criteria for what constitutes style, and any combination thereof, may be used to define a constituent's style. In one embodiment, the potential constituents are ranked from lowest price-to-book ratio to highest price-to-book ratio.

Figure 8:
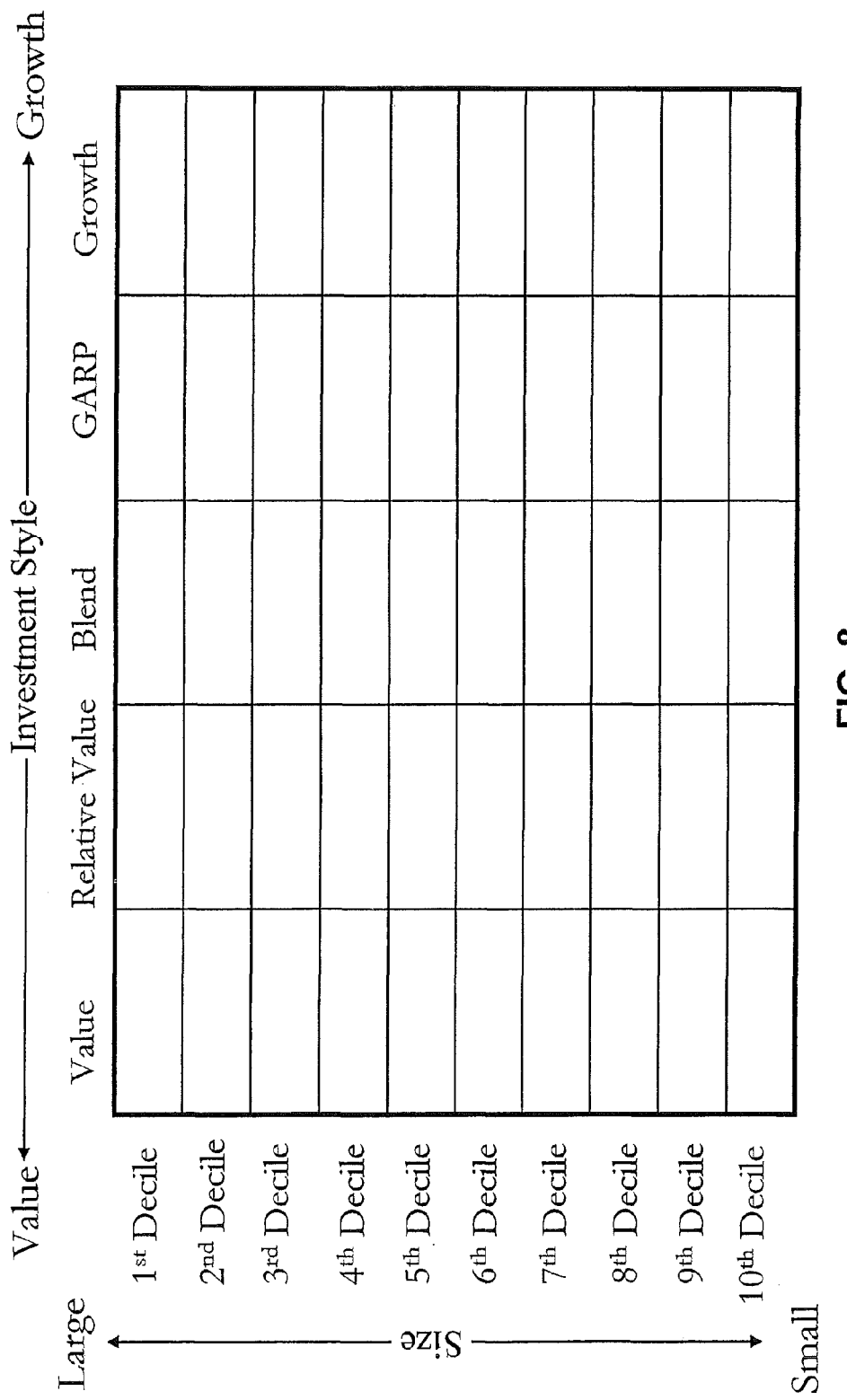
FIG. 8 is an exemplary size and style grid having fifty boxes.

In step 214, the set of potential constituents are divided into boxes of a grid having a vertical axis which represents size and a horizontal axis which represents style. An example grid 800 having fifty boxes is shown in FIG. 8 and further below described with respect to a specific example of constructing an intellectual property index. The set of potential constituents are substantially equally divided amongst the boxes according to each constituent's ranked position of size and style, such that each box has a subset of constituents.

In step 215, constituents in each subset (i.e., in each box) are ranked by each constituents' ratio of an intangible asset measure to a tangible asset measure from highest to lowest ratio to produce an intangible asset ranking. Tangible asset measures are measures of the value of tangible assets of a company or entity, and may include, for example, market capitalization (or size), liquidity, price-to-book (or style), book value, or other financial information, as well as other tangible assets, such as number of employees, and any combination or statistics thereof.

In step 216, based on the intangible asset ranking, a number of constituents in each subset is selected as the index constituents. For example, a top percentage or number may be selected from each subset to be the index constituents. Different numbers or percentages may be selected from each subset depending on the desired number of constituents of a particular size or style. If in step 215 the constituents are ranked instead from lowest to highest ratio, then a bottom percentage or number of constituents is selected, provided that the goal of the index is to comprise constituents with valuable intangible assets.

Another embodiment of the method disclosed herein is shown in FIG. 3. A method 300 includes step 310 and step 320. In step 310, constituents of an index are selected from a set of potential constituents based on an intangible asset measure of each constituent in the set. For example, an index having constituents selected based on a trademark rating measure may be constructed by taking the publicly-traded companies that own the top 100 global brands as reported by Interbrand to be the index constituents. Further, a similar index may be constructed so as to include only those companies ranked by Interbrand that are U.S. companies with U.S. brands, if desired. In step 320, the index constituents are assigned a weight using any desired measure or methodology. In one embodiment, the index constituents are weighted equally. In another embodiment, each index constituent is assigned a weight in the resulting index according to the constituent's market capitalization. The method of selecting index constituents outlined above with respect to FIG. 2 may be used for selecting index constituents in step 310. Another method of selecting index constituents, which also may be employed in either method 100 or 300, includes choosing a set of potential constituents from a list of possible constituents, such as a set of constituents of an existing index, ranking the set of potential constituents by each constituent's ratio of an intangible asset measure to a tangible asset measure in order from the highest to lowest ratio, and selecting a top percentage or number of constituents in the set of potential constituents to be the index constituents. In one embodiment, the intangible asset measure is a patent rating measure and the tangible asset measure is market capitalization. Similarly, further to the example provided above, index constituents may be chosen from the companies ranked by Interbrand based on the ratio of their brand rank to market capitalization. In an embodiment where the index constituents are selected based on an intangible asset measure and the index constituents are assigned a weight using an intangible asset measure, the intangible asset measure used in selecting can be the same or different from the intangible asset measure used in weighing. The set of potential constituents may be the same as the list of possible constituents or may be less than all possible constituents, such as when only a top percentage of the constituents of an existing index are chosen based on some criteria, such as liquidity, or when constituents are eliminated from being chosen because those companies do not own a particular type of intangible asset, as discussed above with reference to step 211 of FIG. 2.

Figure 4:
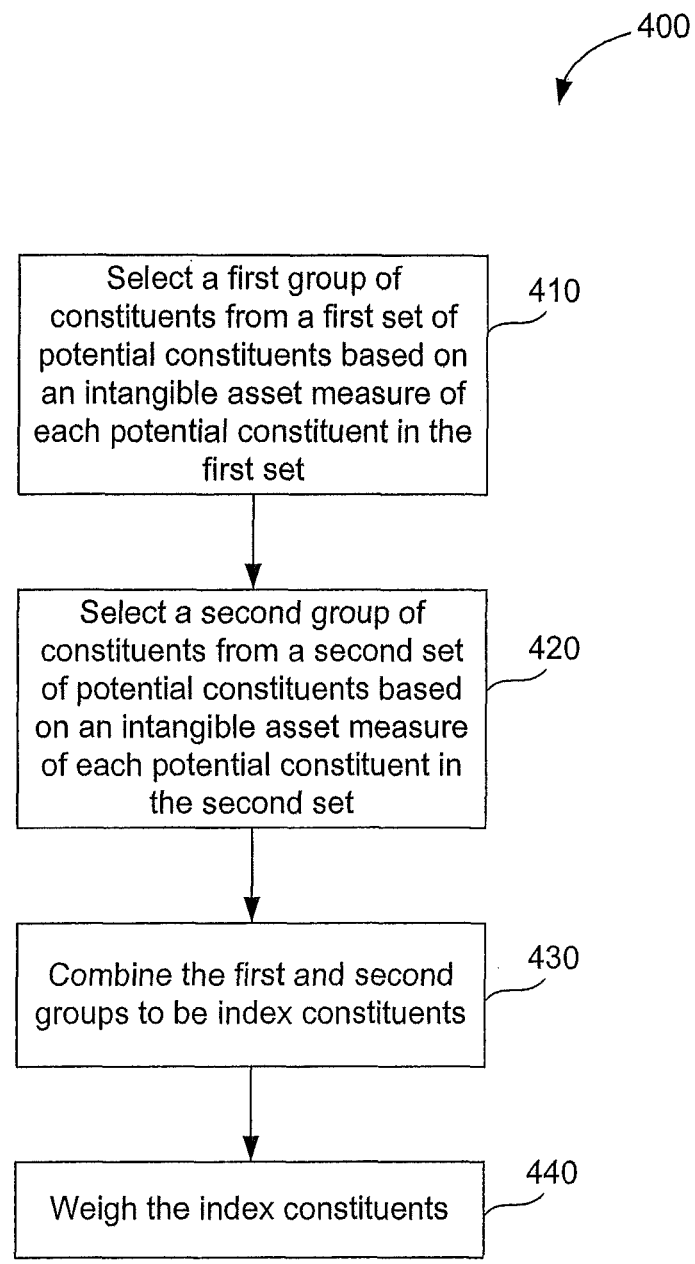
FIG. 4 is a flowchart illustrating steps performed in one embodiment of another method according to the present invention.

In another method for generating an index of securities according to the present invention, index constituents are selected from multiple sets of potential constituents based on an intangible asset measure of each potential constituent in the multiple sets. In this method, the intangible asset measure used to select index constituents may be different for each set of potential constituents. An embodiment of this method is shown in FIG. 4 as method 400. In steps 410 and 420 of method 400, first and second groups of constituents are selected from first and second sets of potential constituents based on an intangible asset measure of each potential constituent in the first and second sets, respectively. The sets may have some, all, or no constituents in common, and the intangible asset measure considered in selecting the first group of constituents may be the same or different from the intangible asset measure considered in selecting the second group of constituents. In step 430, the first and second groups of constituents are combined, and the resulting combination of constituents are the index constituents of the index of securities generated in method 400. It should be understood that method 400 is not limited to two groups of constituents. Additional groups of constituents may be selected from additional sets of potential constituents in a similar manner as the selection of the first and second groups in steps 410 and 420, respectively. These additional groups of constituents may be combined in step 430 with the first and second groups, and the resulting combination of constituents are the index constituents. In one embodiment, three groups of constituents are combined to be the index constituents.

In step 440, the index constituents are assigned a weight in the index. Any desired measure or methodology may be used to assign weights to the index constituents. For example, the index constituents may be weighted based on market capitalization values, intangible asset measures, or may be weighted equally. In one embodiment, the first and second groups of constituents (and any additional groups of constituents) are stocks of respective first and second existing stock indices. As a result, the index constituents each correspond to a stock in the first or second existing stock indices (also referred to herein as "the existing indices"), and the resulting index of securities generated using method 400 is a "combined index", or an index which is a combination of indices.

Figure 5:
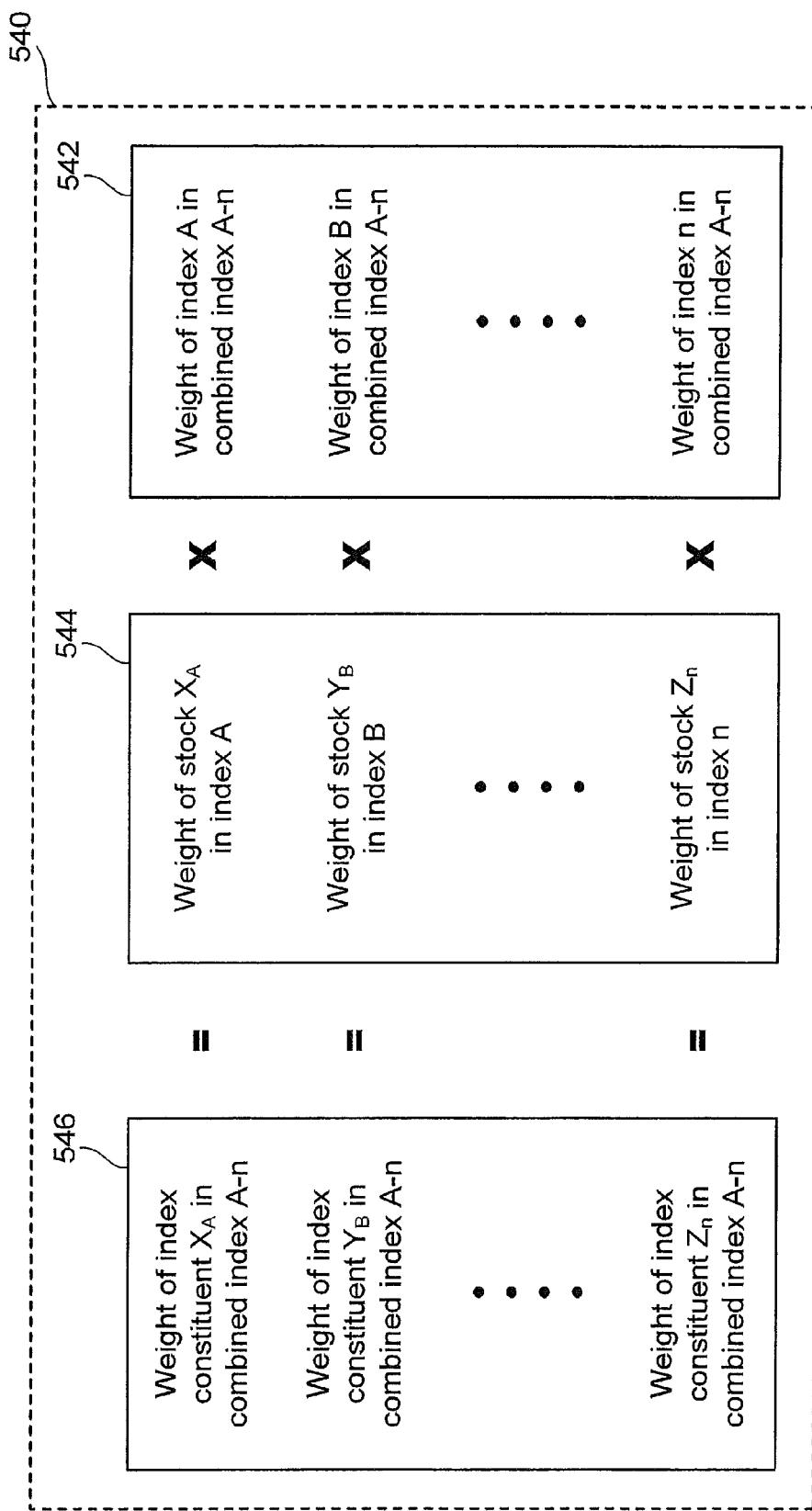
FIG. 5 is a diagram illustrating a formula for calculating a weight of an index constituent in accordance with another embodiment of the other method of the present invention.

In one embodiment, stocks are selected for and/or weighted in a plurality of indices based on intangible asset measures of the stocks, and these indices are combined to generate a combined index. Methods 100 and 300 described above with respect to FIGS. 1-3 may be used to construct these indices incorporated in the combined index. In one embodiment, each stock may have been assigned a weight in the index of which it is a member using an intangible asset measure of that stock. The weights of stocks in the indices may be used in step 440 to determine the weights assigned to the corresponding index constituents of the combined index. FIG. 5 illustrates a formula 540 for calculating weights 546 of index constituents in a combined index A-n using weights 544 of stocks in the indices (i.e., indices A, B, . . . n of FIG. 5). Indices A and B may be existing indices, and any number of additional indices may be included as represented generally by index n. Combined index A-n is a combination of existing indices A, B, . . . n. A weight 546 of an index constituent X.sub.A of combined index A-n, for example, is the product of a weight 544 of the corresponding stock X.sub.A in index A and a weight 542 of index A. Likewise, another weight 546 of an index constituent Y.sub.B is the product of a weight 544 of the corresponding stock Y.sub.B in index B and a weight 542 of index B. Additional index constituents' weights 546 are similarly determined as shown generally for index constituent Z.sub.n in FIG. 5.

Figure 6:
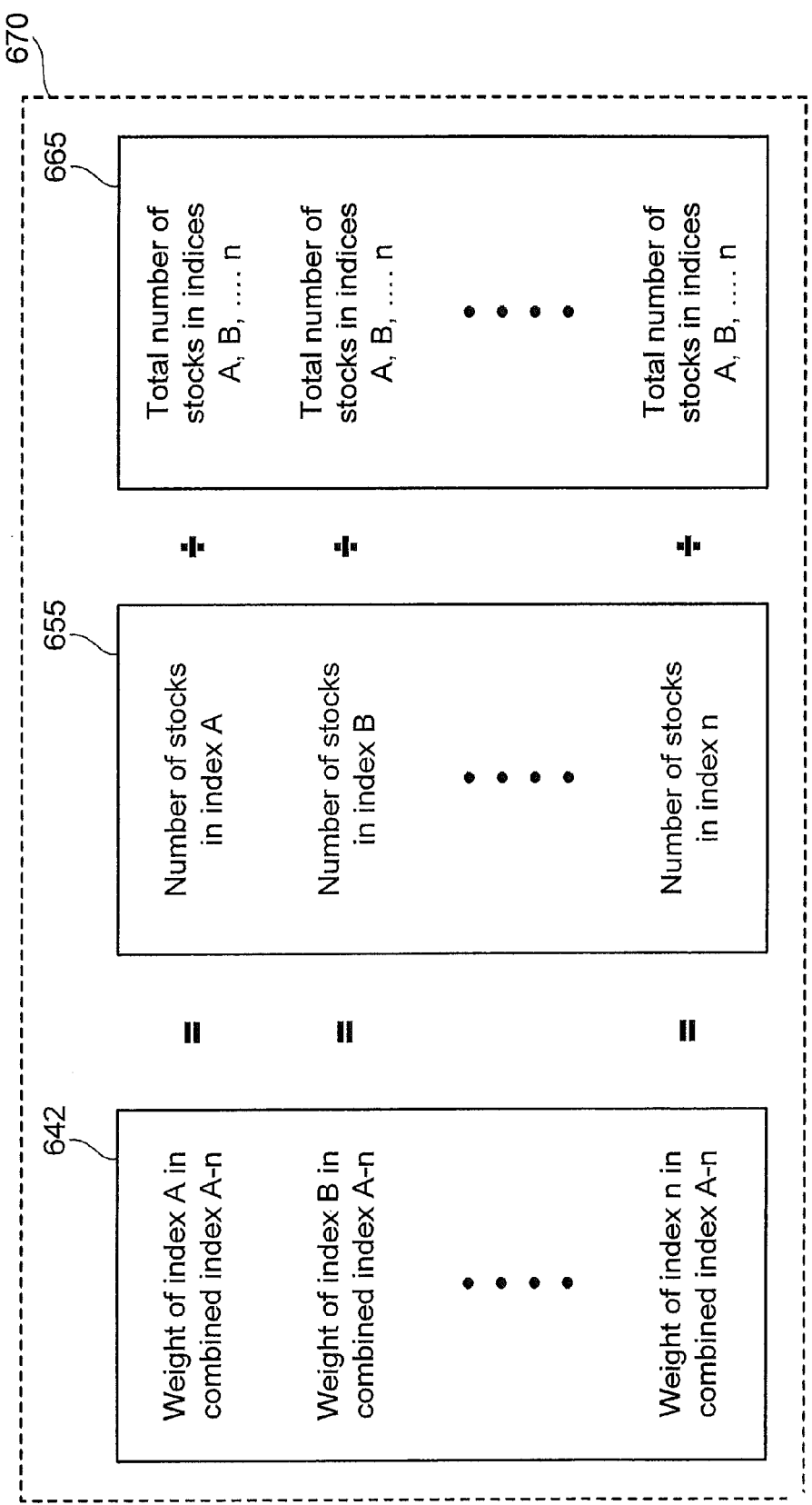
FIG. 6 is a diagram illustrating a formula for calculating a factor used in the formula illustrated in FIG. 5.

The weights 542 of indices A, B, . . . n may be any collection of weights that sum to 1. Any desired methodology may be used for prescribing a weight to each index in the combined index. For example, each index may be weighted equally in the combined index. Thus, if three indices A, B, and C were incorporated into a combined index A-C, the weight 542 of each index A, B, and C would be ⅓. In one embodiment, weight 542 used in formula 540 may be calculated using a formula 670 illustrated in FIG. 6. Weights 642 are determined for indices A, B, . . . n by calculating ratios of a number 655 of stocks in each index to a total number 665 of stocks in all the indices A, B, . . . n. Thus, weight 642 of index A is the ratio of the number 655 of stocks in index A divided by the total number 665 of stocks in indices A, B, . . . n summed together. A similar calculation is performed for the determination of weights 642 of indices B to n. Thus, the weights assigned index constituents of the combined index incorporate both the weighted value and/or quality of intangible assets for the individual stocks which correspond to the index constituents (via weights 544) as well as the weighted composition of the combined index as whole (via weights 642). Thus, weights 642 provide a measure of the extent a particular intangible asset measure is reflected in the combined index, since each index incorporated into the combined index was constructed of stocks taking into consideration intangible asset measures of the stocks.

Thus, method 400 may be used to generated a combined index A-C composed of indices A, B, and C, where index A may be composed of stocks weighted based on a patent rating measure, index B is composed of stocks weighted based on a trademark rating measure, and index C is composed of stock weighted based on a copyright rating measure. As such, combined index A-C is as an intellectual property index that includes stocks of companies which have valuable and/or quality patent, trademark, and copyright portfolios. In one embodiment, index A has 300 stocks, index B has 100 stocks, and index C has 100 stocks, and therefore combined index A-C has 500 index constituents which correspond to these stocks. These index constituents may be assigned a weight using formulas 540 and 670, and in such an instance, the weights assigned to indices A, B, and C in combined index A-C using formula 670 would be ⅗ weight, ⅕ weight, and ⅕ weight, respectively. Thus, combined index A-C is constructed so as to be heavily weighted in stocks of companies having strong patent portfolios over other types of intellectual property assets. Other constructions are possible depending on what is desired to be reflected by the combined index and or what products or services are to be linked to the combined index.

It should be noted that a particular company may belong to more than one index which is incorporated into a combined index generated in accordance with a method disclosed herein. For example, the index constituents of the combined index may include index constituent X.sub.A as well as X.sub.B, and so on, which correspond to stocks X.sub.A and X.sub.B of company X. Nonetheless, where stocks X.sub.A and X.sub.B are weighted in their respective indices A and B based on particular intangible asset measures and these weights are incorporated into the weights of the corresponding index constituents (via formula 540, for example), the weight accorded index constituent X.sub.A reflects one measure of the value and/or quality of a particular intangible asset of company X, whereas the weight accorded index constituent X.sub.B reflects another measure of the value and/or quality of the same or a different intangible asset of company X. Thus, the stock of company X has a greater overall weight in the combined index as the sum of the individual weights assigned to index constituents X.sub.A and X.sub.B. Of course, it should be apparent that the combined index may be constructed such that a company appears only once in the combined index, or the combined index may be constructed such that it has a decided number of different constituent companies even if a company appears in multiple indices of the combined index.

Any number of derivative products can be created based on the intangible asset indexes described above. For example, future contracts, options contracts, swaps, and so on can be issued and traded based on an underlying index. In one embodiment, an index is created based on the intangible assets of a plurality of publicly traded companies. A contract is issued which pays a value in the future depending on the future value of the index.

Exemplary Computer System

Figure 7:
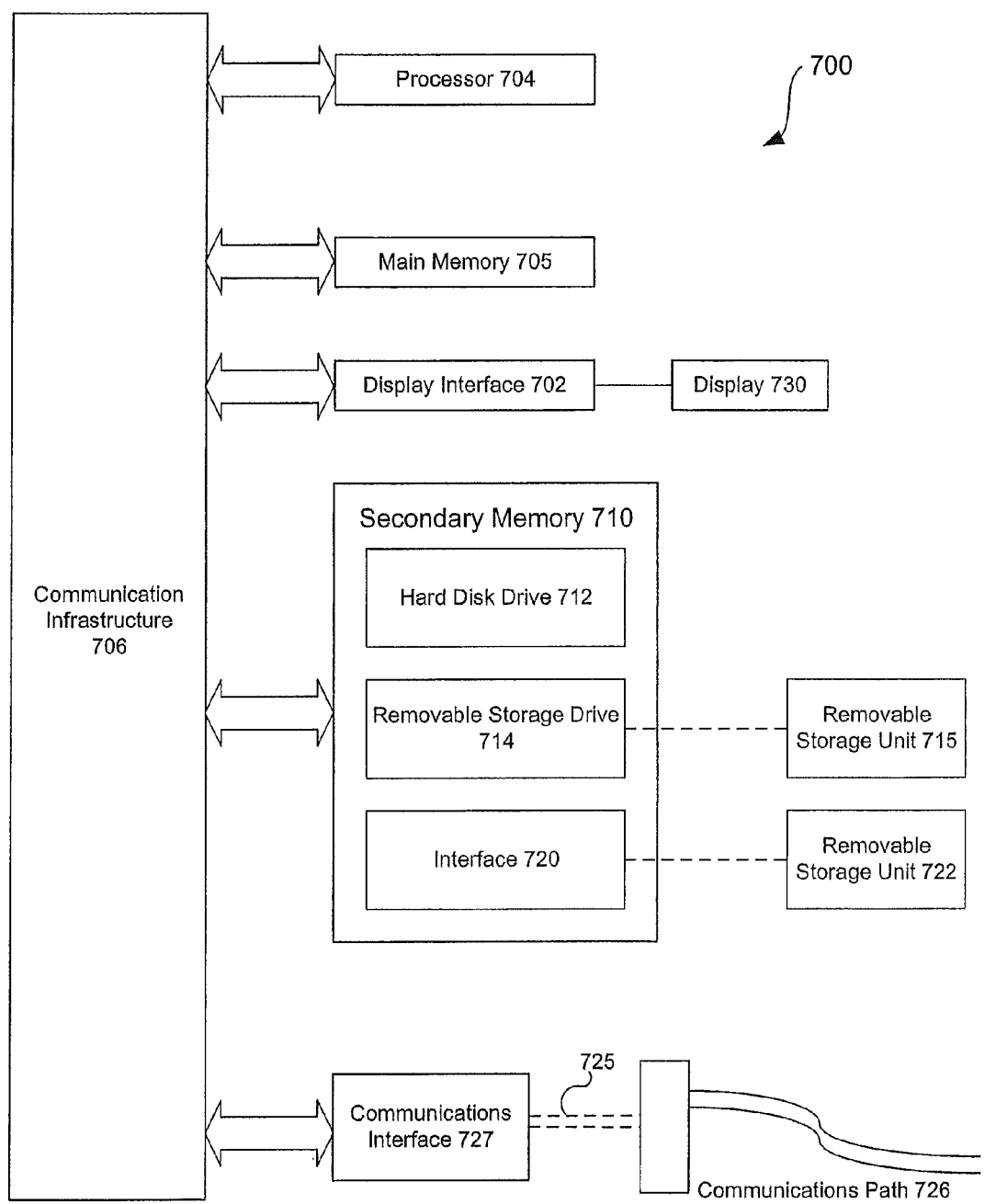
FIG. 7 illustrates an example computer system, in which the present invention can be implemented as computer-readable code.

One or more computer systems may be used to carry out the methods described herein. FIG. 7 illustrates an example computer system 700, in which the present invention can be implemented as computer-readable code. Various embodiments of the invention are described in terms of this example computer system 700. After reading this description, it will become apparent to a person skilled in the relevant art how to implement the invention using other computer systems and/or computer architectures.

FIG. 7 illustrates one or more processors, such as processor 704. Processor 704 can be a special purpose or a general purpose digital signal processor. The processor 704 is connected to a communications infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 can include a display interface 702 that forwards graphics, text, and other data from the communication infrastructure 706 (or from a frame buffer not shown) for display on the display unit 730.

Computer system 700 also includes a main memory 705, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 715 in a well known manner. Removable storage unit 715, represents a floppy disk, magnetic tape, optical disk, etc. which is read by and written to by removable storage drive 714. As will be appreciated, the removable storage unit 715 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a PCMCIA slot and card, wired or wireless systems, etc. Software and data transferred via communications interface 724 are in the form of signals 725 which may be electronic, electromagnetic, optical or other signals capable of being received by communications interface 724. These signals 725 are provided to communications interface 724 via a communications path 726. Communications path 726 carries signals 725 and may be implemented using wire or cable, fiber optics, a phone line, a cellular phone link, an RF link and other communications channels.

In this document, the terms "computer program medium" and "computer usable medium" are used to generally refer to media such as removable storage drive 714, a hard disk installed in hard disk drive 712, and signals 725. These computer program products are means for providing software to computer system 700.

Computer programs (also called computer control logic) are stored in main memory 705 and/or secondary memory 710. Computer programs may also be received via communications interface 724. Such computer programs, when executed, enable the computer system 700 to implement the present invention as discussed herein. In particular, the computer programs, when executed, enable the processor 704 to implement the processes of the present invention, such as the method(s) implemented as described above. These processes may be performed automatically, of invoice some form of manual intervention. Accordingly, such computer programs represent controllers of the computer system 700. Where the invention is implemented using software, the software may be stored in a computer program product and loaded into computer system 700 using removable storage drive(s) 714, hard drive 712 or communications interface 724.

The invention is also directed to computer products (also called computer program products) comprising software stored on any computer useable medium. Such software, when executed in one or more data processing device, causes the data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

EXAMPLE

A Specific Example: Constructing an Intellectual Property Index

An exemplary process for generating a specific intangible asset index will be now be described. In particular, this example illustrates a process for generating an intellectual property index of 300 constituents that is weighted by patent maintenance value. The process includes the following steps:

1) Start with the 1500 stocks in S&P.RTM. index 1500 as being the list of possible constituents. List all the stocks in the S&P 1500.RTM. index on June 30.

2) Select the top 75% of stocks with the most liquidity, e.g., top 1125 stocks.

3) Rank the selected stocks by market capitalization (or size). On June 30, multiply shares outstanding times share price to produce market capitalization. Rank the stocks from the largest market capitalization to the lowest market capitalization. The stocks on this list will then be divided into ten groups with 112 or 113 names in each group. Deciles 1 & 2 may be called ultra large cap. Deciles 3 & 4 may be called large cap. Deciles 5 & 6 may be called mid-cap. Deciles 7 & 8 may be called small/mid-cap. Deciles 9 & 10 may be called small cap. It should be understood that other names may be used, considering that a different sized grid or subset of the grid, or a different number of stocks in the initial list of securities may be used for selecting index constituents according to a method disclosed herein (see steps 5 and 6 below).

4) Rank the stocks by price-to-book (or style). On June 30, calculate the price-to-book ratio of each stock selected in step 2 above. Rank the stocks from the lowest price-to-book to the highest price-to-book. The stocks on this list will then be divided into five groups with 225 stocks in each group. Group 1 may be called value (or deep value). Group 2 may be called relative value. Group 3 may be called core (or blend). Group 4 may be called growth at a reasonable price (or GARP). Group 5 may be called growth (or momentum growth). It should be understood that other names may be used, considering that a different sized grid or subset of the grid, or a different number of stocks in the initial list of securities may be used for selecting index constituents according to a method disclosed herein (see steps 5 and 6 below).

5) Create a grid of 50 boxes: 10 rows by 5 columns. Market Capitalization will represent the vertical axis of the grid. Price-to-book (or style) will represent the horizontal axis of the grid. There are now 50 boxes representing the full spectrum of market capitalization (or size) and price-to-book (or style). An example size and style grid 800 having fifty boxes is illustrated in FIG. 8, with Groups 1-5 and Deciles 1-10 described above in steps 3 and 4. It should be understood that more boxes or fewer boxes may be created when generating an index according to a method disclosed herein.

6) Put the 22 or 23 most relevant stocks in each box. In other words, the largest 22 stocks with the lowest price-to-book would go in the upper left box. The smallest 22 stocks with the highest price-to-book would go in the lower right box. The smallest 22 stocks with the lowest price-to-book would go in the lower left box. Each of the 50 boxes should have 22 or 23 securities since 1125 stocks divided by 50 boxes equals 22.5 stocks in each box. It should be understood that the number of constituents that go into each box may be changed depending on the initial list of securities or how many boxes are created or decided be to used. Moreover, when generating an index according a method disclosed herein, it may be decided that only a subset of boxes that have been created will be further used to select the index constituents.

7) Rank each of the stocks in each box by a ratio of OTMV to market capitalization using June 30 data. OTMV is calculated by Ocean Tomo Patent Ratings, LLC ("PatentRatings"). This information is typically not available from PatentRatings until a few months after June 30.

8) Select the top 6 stocks in each of the 50 boxes. Since 6.times.50=300, the 300 stocks resulting from this step are selected as the index constituents. This is a diversified list of stocks of companies that own quality patent portfolios representing the full spectrum of market capitalization (or size) and price-to-book (or style). It should be understood that a greater or lesser number of stocks, or stocks which correspond to a particular size or style may be selected may be selected as constituents of an index generated according to a method disclosed herein.

9) Assign a weight to each of the 300 stocks by OTMV. As of June 30, calculate the OTMV for each index constituent stock. Sum the OTMV amounts for all 300 stocks. Calculate a stock's weight in the index by dividing its OTMV by the sum of all of the OTMV amounts for all 300 stocks. The weightings of all 300 stocks should equal 100%. This step should skew the index to be weighted in companies with larger market capitalizations, since, typically, larger companies own larger patent portfolios; however this is not the case for each particular stock in the index. Index shares of a constituent stock may be calculated as being the stock's weight times index market value (i.e., the dollar amount for the hypothetical portfolio) divided by the stock's current price. The index value may be calculated as index market value divided by an index divisor.

10) Create and reconstitute the index on each December 31 using the prior June 30 data. June 30 data is chosen for this example because delay in information from PatentRatings; however, it should be understood that an index generated according a method disclosed herein may be reconstituted on a different date, more frequently (or less frequently) and with a smaller gap in time between calculation date of intangible and/or tangible asset measures and reconstitution date, such as reconstitution semi-annually, quarterly, or when otherwise desired or needed, e.g., in response to changes in any underlying existing index used to construct the index (e.g., S&P 1500.RTM. index, as in this example), and/or as a result of assessment of liquidity and trading costs, and/or as a result of the U.S. Patent and Trademark Office issuing new patents weekly.

The foregoing example produces an index which represents a spectrum of capitalization/size ranges and styles across a variety of sectors. Companies with more valuable patent portfolios have a larger weighting in the index.

Results for this exemplary intangible asset index based on historical data indicate that for the ten year-period ending Dec. 31, 2005, a hypothetical investment in the stocks in an index created using the present method would have produced an annualized return of 17.6%, which outperformed the Russell.RTM. 3000 index by 8.4% on an annualized basis. This exemplary index would have outperformed the broad market as represented by the Russell.RTM. 3000 index in 85 out of 85 rolling three-year periods during the ten-year period ending Dec. 31, 2005, and had a standard deviation of 19.2% annualized for the ten-year period ending Dec. 31, 2005.

This exemplary index would have also outperformed the broad market as represented by the Russell.RTM. 3000 index in both up and down markets. On average, this index captured 144% of the upside and only 95% of the downside. Thus, when the Russell.RTM. 3000 index went up 10%, on average this exemplary index went up 14.4%; and when the Russell.RTM. 3000 index fell 10%, on average this index fell only 9.5%.

While a particular form of the invention has been illustrated and described, it will be apparent that various modifications can be made without departing from the spirit and scope of the invention. For example, it will be apparent to those skilled in the relevant art(s), after reading the description herein, that patent rating scores may be obtained from patents issued by other national/regional patent offices (EPO, JPO, etc.) in lieu or in addition to scores for U.S. patents, and combined with publicly-traded equities in such corresponding foreign exchanges to build indices similar to those described herein. Further, in yet another embodiment—as will be apparent to those skilled in the relevant art(s) after reading the description herein—the methodology of the present invention may be used to select the stocks of companies with the best patent portfolios as the constituents of an index and then weigh each stock in the resulting index according to the more traditional measure of market capitalization. Further still, while the present invention is described in terms of creating a stock "index," it will apparent to those skilled in the relevant art(s) after reading the description herein that the methodology of the present invention can be used to not only create an index, but to actively manage a "portfolio" (i.e., for asset management purposes such as managing a hedge fund or other money fund). Therefore, the breadth and scope of the present invention should not be limited by any of the above-described exemplary embodiments, but should be defined only in accordance with the following claims and their equivalents.

What is claimed is:

1. A computer system method for formulating an intellectual property index, the method comprising the steps of:
selecting through instructions stored in a computer system one or more index constituents from a group of index constituents to obtain one or more selected index constituents, wherein said selecting step further comprises the steps of:
ranking each index constituent of the group of index constituents based on one or more measures of liquidity, size, and style to obtain ranked index constituents;
choosing the ranked index constituents that are within a specified percentage;
assigning through instructions stored in a computer system a weight value to each of the one or more selected index constituents using an intangible asset measure, wherein the intangible asset measure is a patent rating measure consisting of patent count, patent age, patent decay rate, patent velocity, patent flow, patent abandonment count, patent diversification, total patent forward cites, new patent forward cites, average intellectual property quotient, patent maintenance value, patent exchange value;
generating through instructions stored in a computer system a patent based index; and
displaying the patent based index on a display unit of the computer system.

2. The computer system method for formulating an intellectual property index according to claim 1, wherein said assigning step further comprises the step of calculating a ratio of the patent rating measure of each of the one or more selected index constituents to the sum of the patent rating measures of all index constituents in the group of index constituents.

3. The computer system method for formulating an intellectual property index according to claim 1, wherein two or more patent rating measures are combined, placed in relation to each other, or placed relative to asset information to produce additional metrics.

4. The computer system method for formulating an intellectual property index according to claim 3, wherein the additional metrics are one more selected from the group of change in patent abandonment count, ratio of patent maintenance value to market capitalization, and ratio of patent maintenance value to research and development expenditures.

5. The computer system method for formulating an intellectual property index according to claim 1, wherein the group of index constituents are from one or more existing indices.

6. The computer system method for formulating an intellectual property index according to claim 1, wherein the measure of liquidity is determined by an average daily dollar volume traded on a particular date for each index constituent of the group of index constituents.

7. The computer system method for formulating an intellectual property index according to claim 1, wherein the measure of size is determined by market capitalization for each index constituent of the group of index constituents.

8. The computer system method for formulating an intellectual property index according to claim 1, wherein the measure of size is determined by sales for each index constituent of the group of index constituents.

9. The computer system method for formulating an intellectual property index according to claim 1, wherein the measure of size is determined by net income for each index constituent of the group of index constituents.

10. The computer system method for formulating an intellectual property index according to claim 1, wherein the measure of style is determined by price-to-book for each index constituent of the group of index constituents.

11. The computer system method for formulating an intellectual property index according to claim 1, wherein the measure of style is determined by price-to-earnings for each index constituent of the group of index constituents.

12. The computer system method for formulating an intellectual property index according to claim 1, wherein the measure of style is determined by dividend yield for each index constituent of the group of index constituents.

13. The computer system method for formulating an intellectual property index according to claim 1, wherein the one or more selected index constituents are stocks.

\* \* \* \* \*